(12) United States Patent
Haroun et al.

(10) Patent No.: US 11,460,551 B2
(45) Date of Patent: Oct. 4, 2022

(54) VIRTUAL ARRAY METHOD FOR 3D ROBOTIC VISION

(71) Applicant: TEXAS INSTRUMENTS INCORPORATED, Dallas, TX (US)

(72) Inventors: Baher Haroun, Allen, TX (US); Rahmi Hezar, Allen, TX (US); Srinath Ramaswamy, Murphy, TX (US); Nirmal C. Warke, Saratoga, CA (US); David Magee, Allen, TX (US); Ting Li, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 891 days.

(21) Appl. No.: 16/287,411

(22) Filed: Feb. 27, 2019

(65) Prior Publication Data
US 2020/0209359 A1    Jul. 2, 2020

Related U.S. Application Data

(60) Provisional application No. 62/786,906, filed on Dec. 31, 2018.

(51) Int. Cl.
*G01S 7/481*    (2006.01)
*G01S 17/10*    (2020.01)
*G01S 7/4865*   (2020.01)
*G01S 7/484*    (2006.01)

(52) U.S. Cl.
CPC ............ *G01S 7/4817* (2013.01); *G01S 7/484* (2013.01); *G01S 7/4865* (2013.01); *G01S 17/10* (2013.01)

(58) Field of Classification Search
CPC ...... G01S 7/4811; G01S 7/4817; G01S 7/483; G01S 7/484; G01S 7/4863; G01S 7/4865; G01S 17/10; G01S 17/89; G01S 17/894; G01S 17/93
See application file for complete search history.

(56) References Cited

U.S. PATENT DOCUMENTS

| | | | |
|---|---|---|---|
| 2016/0306032 A1* | 10/2016 | Schwarz | G01S 7/497 |
| 2017/0003392 A1* | 1/2017 | Bartlett | G01S 17/10 |
| 2017/0328989 A1* | 11/2017 | Bartlett | G01S 7/4814 |
| 2017/0328990 A1* | 11/2017 | Magee | G01S 17/931 |
| 2020/0018837 A1* | 1/2020 | Baron | G01S 7/4815 |
| 2020/0166616 A1* | 5/2020 | East-Lavoie | H04B 1/123 |
| 2020/0209984 A1* | 7/2020 | Li | G06F 3/0346 |
| 2021/0124047 A1* | 4/2021 | Egawa | G01S 7/4865 |

* cited by examiner

*Primary Examiner* — Luke D Ratcliffe
*Assistant Examiner* — Woohyeong Cho
(74) *Attorney, Agent, or Firm* — Ray A. King; Charles A. Brill; Frank D. Cimino

(57) ABSTRACT

A pulsed light source illuminates a scene with a virtual array of points. Light reflected by the scene is detected by a small pixel array, allowing generation of a three-dimensional map of the scene. A processing element processing data output by the small pixel array uses a multipath resolution algorithm to resolve individual objects in the scene.

16 Claims, 4 Drawing Sheets

VIRTUAL ARRAY METHOD FOR 3D ROBOTIC VISION

RELATED APPLICATION

This application claims priority to U.S. Provisional Application No. 62/786,906, filed Dec. 31, 2018, which is hereby incorporated by reference in its entirety.

TECHNICAL FIELD

The present disclosure relates to the field of robotic vision, and in particular to low power high resolution three-dimensional (3D) robotics vision techniques.

BACKGROUND ART

The field of robotic vision has expanded tremendously recently. In both home and industrial markets, robotic vision is helping improve efficiency, safety and mobility. From home devices such as robotic vacuum cleaners to industrial assembly line robots, there is a need for 3D robotic vision. Autonomous vehicles such as drones and self-driving automobiles also have a great need for 3D robotic vision. While optical 3D sensing has the potential to provide the highest resolution compared with other sensing modalities such as ultrasound and millimeter wave technology, current 3D optical sensor devices rely on large sensor arrays and consume significant amounts of power, but produce results with limited resolution.

SUMMARY

In one example, a system for three-dimensional robotic vision includes a light source and a transmit optical element. The transmit optical element is configured to project a virtual array pattern of laser points that illuminates a scene. The system also includes a receive imaging lens configured to receive reflected light from the scene and project the light onto a pixel array. The system further includes a processing element coupled to the pixel array and configured to generate a three-dimensional map of the scene from information generated by the pixel array responsive to receiving the reflected light.

BRIEF DESCRIPTION OF DRAWINGS

The accompanying drawings, which are incorporated in and constitute a part of this specification, illustrate an implementation of apparatus and methods consistent with the present disclosure and, together with the detailed description, serve to explain advantages and principles consistent with the disclosure. In the drawings.

DETAILED DESCRIPTION

In this description: (a) references to numbers without subscripts are understood to reference all instance of subscripts corresponding to the referenced number; and (b) reference to "one embodiment" or to "an embodiment" means that a particular feature, structure or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

Figure 1:
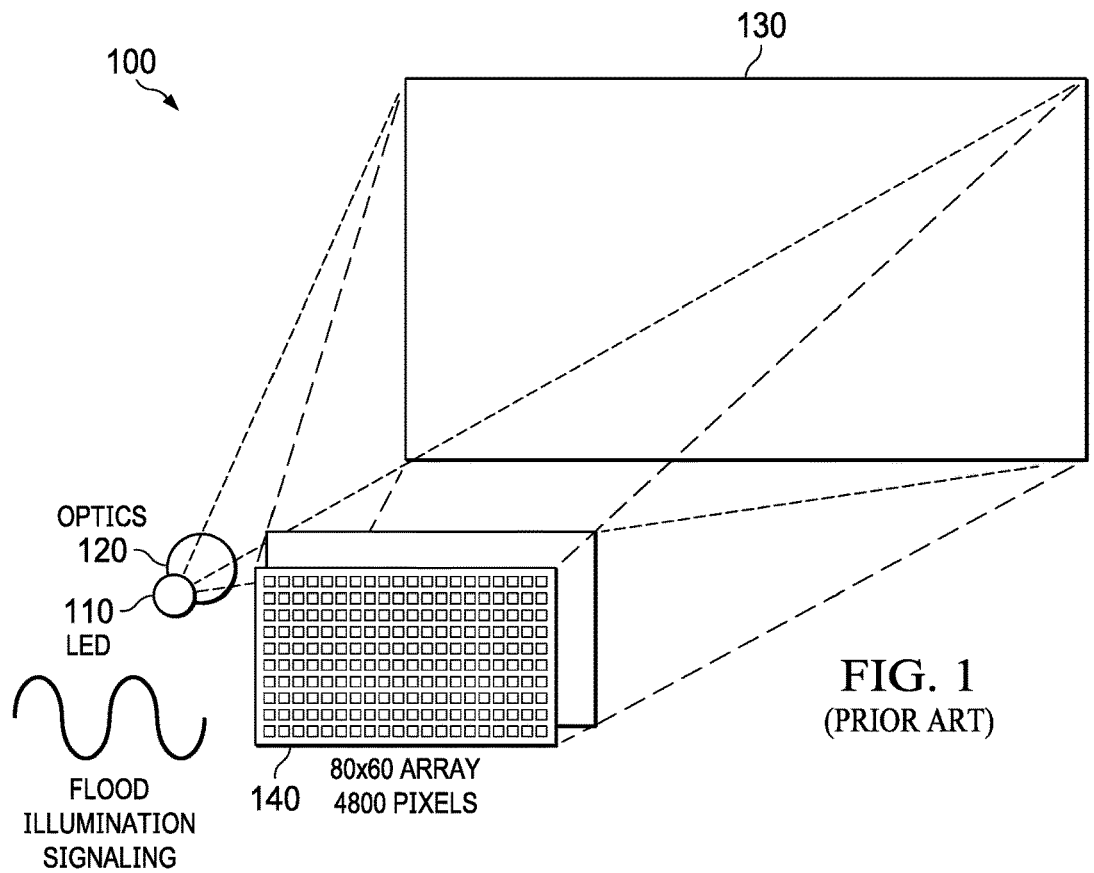
FIG. 1 is a block diagram illustrating a robotic vision technique employing uniform spatial modulation of light also known as flood illumination according to the prior art.

FIG. 1 is a block diagram illustrating a conventional 3D robotic vision technique according to the prior art. Flood illumination using time modulated light is used to illuminate a scene 130, typically with an LED light source 110 and relevant optics 120. The modulation causes the light intensity to vary over time with a certain frequency, but the technique floods the entire scene with light for a predetermined amount of time. Light reflected by the scene is detected by large pixel array 140, typically an 80×60 array of 4800 pixels in order to obtain a usable resolution. Manufacturing of large pixel arrays is costly. In addition, each pixel must be processed, the data from the pixels must be converted into a usable format, and the result is a large amount of data computation, which requires significant power to construct the 3D image, by performing time of flight calculations to compute the distance between the pixel and the source of the light reflected back to the pixel.

This kind of flood illumination has an optical power loss proportional to $$\frac{1}{d^2} (d = \text{distance})$$

in both the transmit and receive paths. Low intensity light may be used for safety and power consumption reasons, but low intensity light is optically power inefficient compared to using high intensity light illumination techniques described below. In addition, using the large pixel array 140, which is required to obtain the required resolution, is electrically power inefficient. Each sensor pixel in the large pixel array 140 would need a dedicated analog front end (AFE). Digitizing the large pixel array 140 is computationally intensive, which means that the power utilization of this prior art technique is large. In addition, the amount of time required to process all 4800 pixels means that slow data access can cause image distortion and artifacts in the digital images produced from the pixel data.

Other approaches such as lidar systems use motorized or optical scanning of a scene that require complex mechanical apparatus, making them inappropriate for many type of 3D robotic vision applications.

Figure 2:
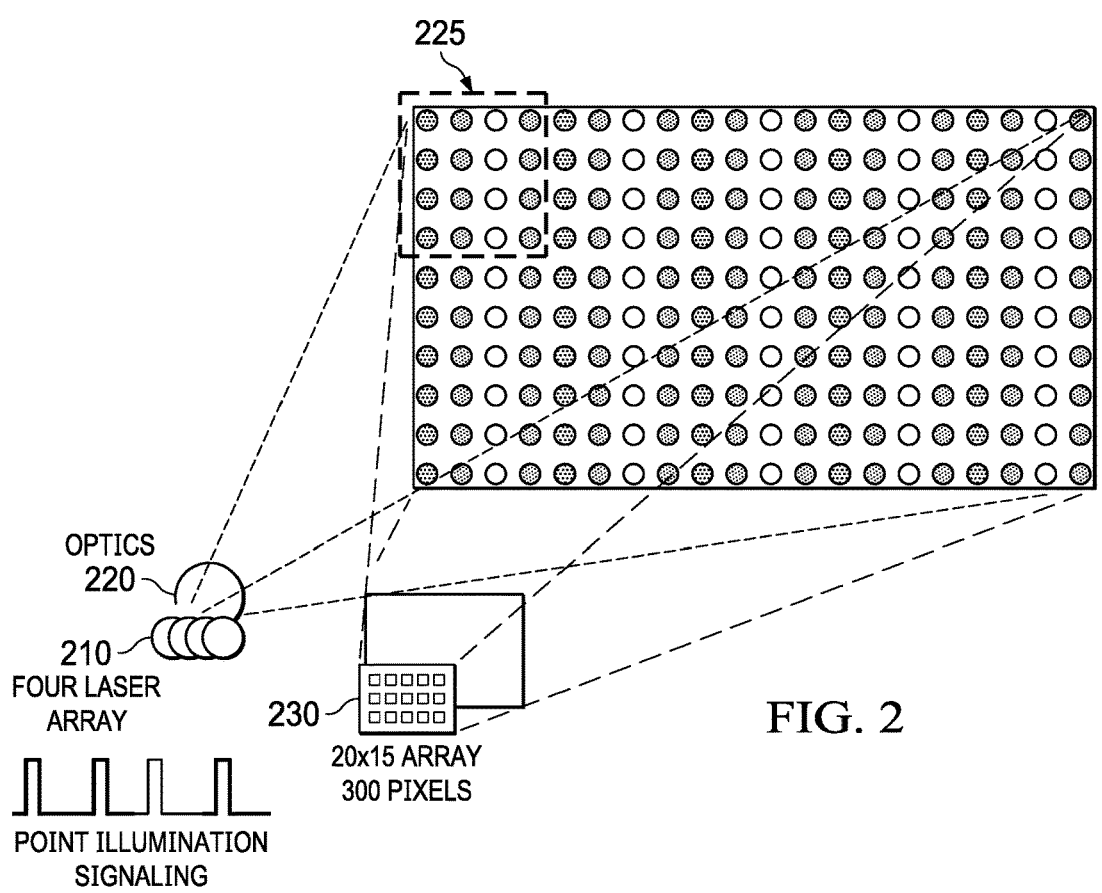
FIG. 2 is a block diagram illustrating a robotic vision technique employing discrete spatial modulation of light according to one embodiment.

FIG. 2 is a block diagram illustrating a system for 3D robotic vision according to one embodiment that uses discrete spatial modulation of light. In this example, a light source such as an array of four lasers 210 can transmit light through diffractive optical elements (DOEs) 220 to create the spatial modulation pattern.

Figure 3:
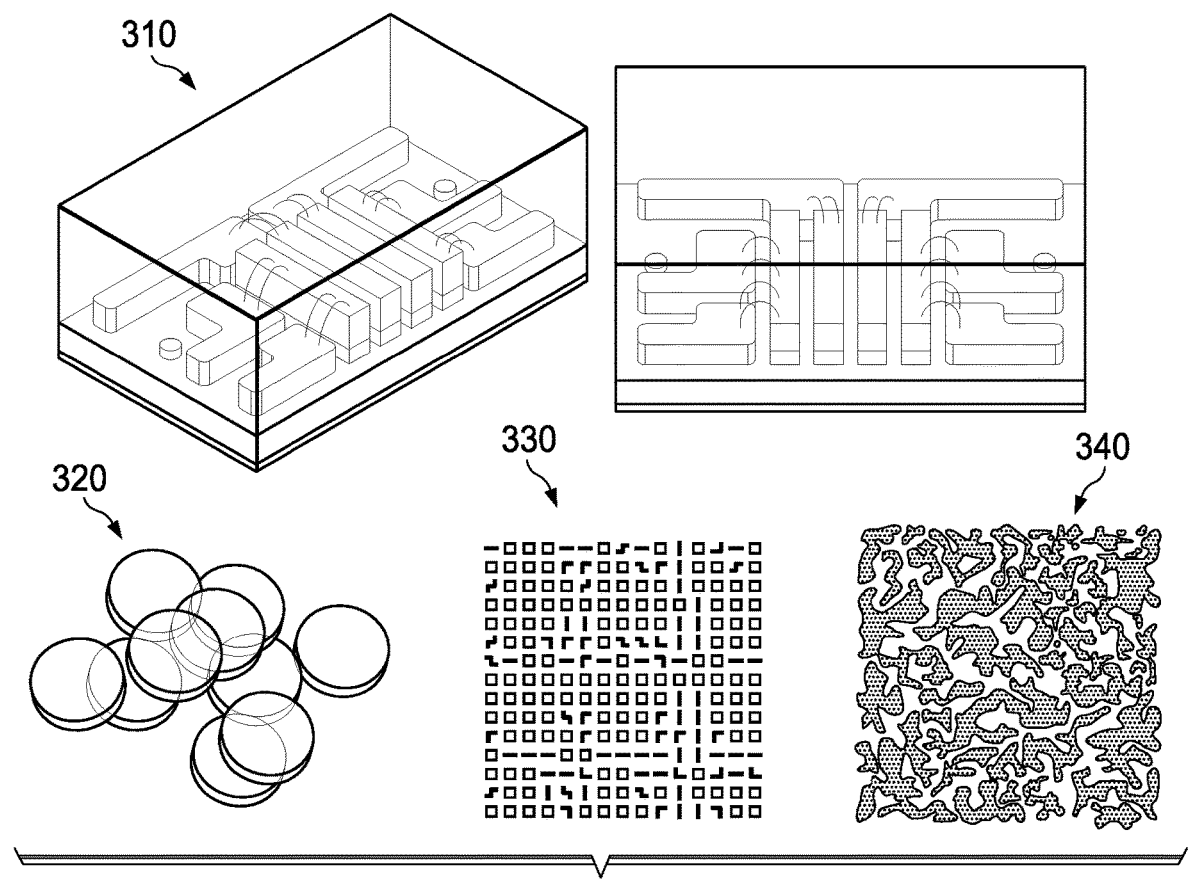
FIG. 3 is an example of a light source, diffractive optical elements, and spatial modulation patterns according to one embodiment.

FIG. 3 illustrates two elements that can be used in a pulsed system such as the system of FIG. 2 according to one embodiment. Chips 310 are examples of a four laser array, each of which can be configured to generate light independently at the same wavelength, typically in the infrared range. For example, a 4-channel 905 nm laser diode using InGaAs lasers provides a chip that allows four individually addressable lasers with no electronic or optical crosstalk, rise and fall times of under 1 ns, and optical power of 75 W. Table 1 below illustrates some of the reasons why a laser chip such as chip 310 may be preferable to a light-emitting diode (LED) light source:

TABLE 1

|  | LED | Laser |
| --- | --- | --- |
| Mode of operation | Spontaneous emission of light (non-coherent) | Spontaneous emission of light (coherent) |
| Ability to focus | Cannot be focused to a narrow beam | Can be focused to a narrow beam |
| Electro-optical efficiency | Low ~10% | High ~40% |
| Modulation speed | Low ~10 Mhz | High ~GHz |
| Pulsed operation | Long pulses ~100 ns | Short pulses <1 ns |
| Peak power | 4 W (low peak power) | 120 W (high peak power) |
| Average power | 2 W (high average power) | 120 mW (low average power) |
| Forward voltage drop | ~3 V | ~10 V |
| Line width (spectral width) | 30 nm @ 850 nm | 5 nm @ 905 nm |
| Emitter size (for same W) | Large (1 mm) | Small (100 μm) |
| Cost (M units) | <$0.10 | <$1 |

DOEs 320 are optical elements that diffract the light passing through them from a single coherent light source into a pattern of points. DOEs 320 are typically made of plastic or glass, and can be made inexpensively. DOEs 320 can be configured with any desired pattern, such as regular array pattern 330 or irregular pseudo-random pattern 340 illustrated in FIG. 3. Thus, one laser can become a multitude of points in the virtual array that illuminates the scene. Typically, each laser in the laser array 310 is split by a DOE 320 to illuminate the scene with a plurality of points, with each laser being turned on and off at different times from each of the other lasers in the laser array 310, producing illuminated points in a virtual array at different times. In some embodiments, pulses of 100 MHz may be used from each of the lasers in the laser array 310. The pulse width is determined by the laser array 310, and a smaller pulse width, such as 1 ns, is preferable to keep energy requirements low.

Although described here in terms of laser light sources and DOEs, other light sources and other techniques for generating a virtual array of points can be used. For example, display devices based on optical micro-electro-mechanical technology using digital micro-mirrors, such as a DLP® imaging device from Texas Instruments, can be used instead of a DOE. Phased arrays can also be used for steering a light source to form a virtual array instead of a DOE.

Instead of flooding the scene, light from each of the four lasers can be diffracted into a collection of points, such as 4×4 array 225. Light reflected back from the scene from each of the 4×4 arrays of points 225 is captured by single pixel of a small pixel array 230, such as a 300 pixel 20×15 array in one embodiment. At any given moment in time in this embodiment, the pixel sees only the four points from one of the four lasers of the laser array 310, but with a computational technique described below, all four points can be resolved.

Although there is optical loss, by using a laser dot projection technique such as this, the optical power loss is proportional to $$\frac{1}{d^2}$$

in only me receive pain, so mere is less optical power loss than in the technique illustrated in FIG. 1. Furthermore, because the light is spatially modulated as discrete points in the field-of-view, the optical intensity is higher at these locations than the flood illumination approach of FIG. 1. This approach results in lower optical power requirements for the discrete spatial modulation technique of FIG. 2. In addition, the use of discrete spatial modulation allows the use of signal processing algorithms that can resolve multiple points using a single pixel. The reduced size of the small pixel array 230 simplifies the hardware of the pixel array considerably, allowing saving power at the interface for the small pixel array 230, as well as providing the capability for faster image processing, which in turn leads to a reduction in image distortion.

Figure 4:
FIG. 4 is a pair of graphs illustrating differences between low intensity, low frequency time modulated light and high intensity, high frequency time modulated light for robotic vision according to one embodiment.

A further aspect relates to the time modulation of the light, which is explained in FIG. 4. On the left is a graph 410 of light from a low intensity, low frequency modulated source, such as is used in the system of FIG. 1, and on the right is a graph of light from a high intensity, high frequency modulated source 420, such as is used in the system of FIG. 2. For detectability, the received light at the receiver should have a signal-to-noise ratio (SNR) of more than 10-15 dB, implying a false alarm rate of <10%. The transmitted optical energy, E, for each measurement can be computed using the following equation $$E = N \cdot S \cdot T_p$$

where N is the number of pulses, S is the peak optical signal power in watts and $T_p$ is the duration of one pulse (half power, full width). For diodes, the peak optical power is proportional to current. As a result, when the noise in the system is dominated by the analog circuitry (e.g. photodiode shot noise, AFE noise, etc.), the SNR $\propto S^2 \cdot N \cdot T_p$. The safety of a light source is related to the total number of photons per second transmitted by the light source (i.e. the amount of optical power than can be transmitted onto a given field-of-view). As a result, the amplitude of the signal S can be calculated as $$S = \frac{E}{N} \cdot T_p$$

where E=the energy of the light transmitted. Finally, the precision of the detector P is proportional to the ratio of the pulse width to the square root of the SNR, or $$P \propto \frac{T_p}{\sqrt{SNR}}.$$

As a result, one can perform system tradeoffs for the two illumination techniques.

As an example of flood illumination, a robotic vision system requires an amplitude S=5 mA, a number of pulses N=20 k, and a pulse width $T_p$=20 ns, leading to a total time $T_f$=4 ms. In contrast, the proposed discrete spatial modulation system as illustrated in FIG. 2, while using a higher peak power light source, because the light source illuminates discrete points in the field-of-view instead of the entire field-of-view, can use an amplitude of S=8 A, but only five pulses, with a pulse width $T_p$=2 ns. This illumination approach results in a SNR that is 64 times (18 dB) higher than the flood illumination technique, an energy, E, usage that is 25 times less, and a precision, P, that is 80 times higher. Thus, the 3D robotic vision system of FIG. 2 can be more detectable, safer, and more precise than the flood illumination system of FIG. 1.

A multipath resolution algorithm may be used to identify objects in the scene. One such algorithm is the Multi-Signal Classification (MUSIC) algorithm, but other multipath resolution algorithms may be used. The MUSIC technique involves eigenvalue decomposition on the sample covariance matrix:

$$\hat{R} = [V_s \; V_n] \begin{bmatrix} \lambda_s & 0 \\ 0 & \lambda_n \end{bmatrix} [V_s \; V_n]^H$$

Eigenvalue decomposition forms an orthonormal basis to separate the signal space as orthogonal to the noise space. Forming a one-dimensional searching (steering) vector:

$$a(d_k) = \left[ e^{j\omega_1 \frac{d_k}{c}}, \ldots, e^{j\omega_L \frac{d_k}{c}} \right]$$

The signal space, which is orthogonal to the noise subspace can be spanned, forming a MUSIC spectrum:

$$P(d_k) = \frac{1}{|a(d_k)V_n|^2}$$

Figure 5:
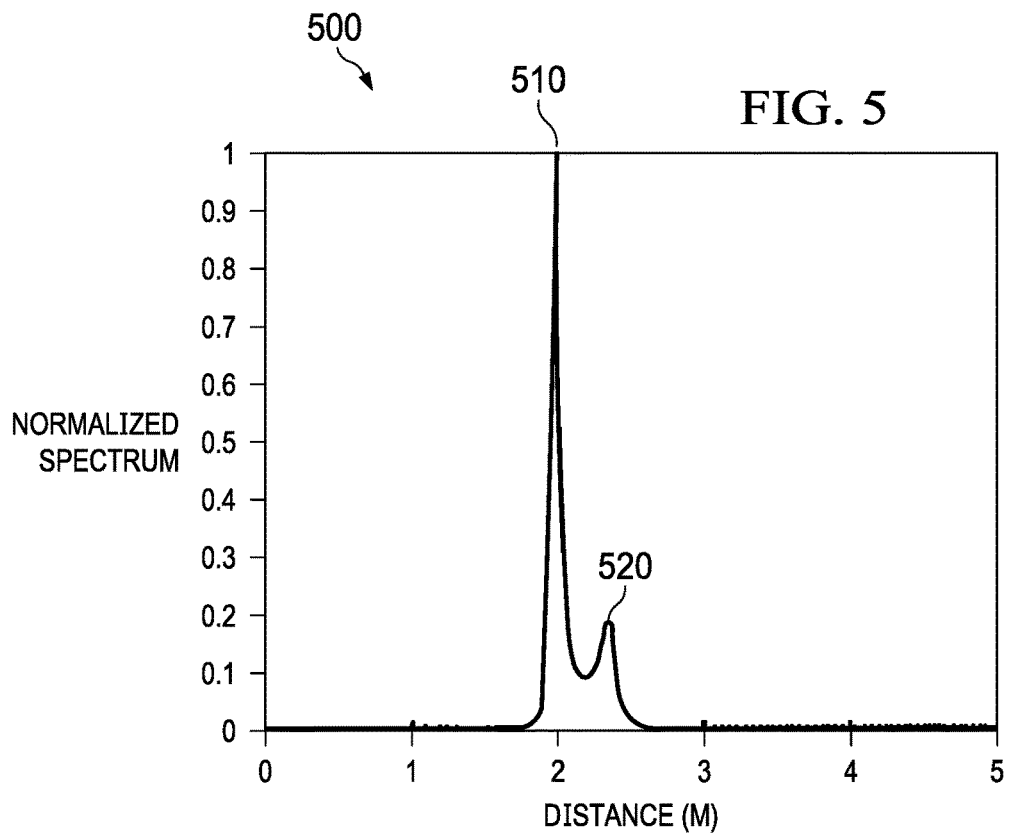
FIG. 5 is a graph illustrating resolving two sources according to one embodiment.
Figure 6:
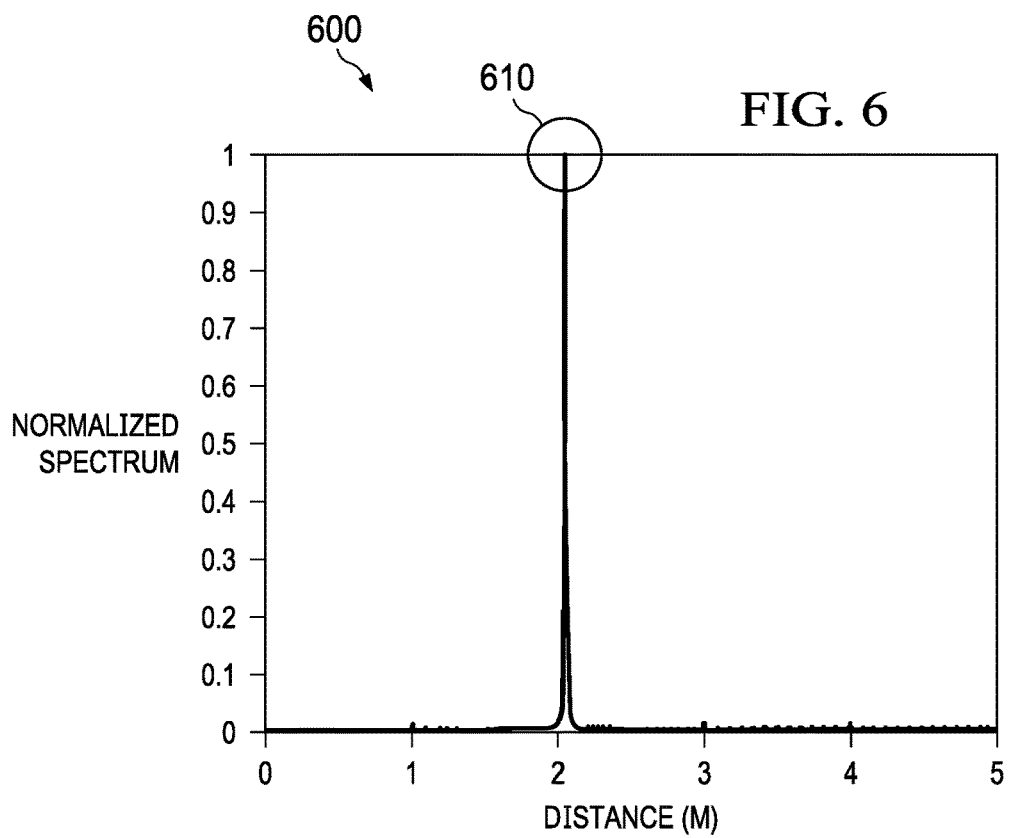
FIG. 6 is graph illustrating the inability to resolve two sources according to another embodiment.

Peaks in the MUSIC spectrum correspond to signal sources. The resolution depends upon the pulse rate of the signal source. For example, in FIG. 5, which is a graph 500 of distance versus normalized spectrum, peaks 510 and 520 can be resolved at 2 m and 2.3 m pulsing the laser light at 50 MHz. In FIG. 6, which is a graph 600 of distance versus normalized spectrum, pulsing the light at 20 MHz means the two sources cannot be resolved, but appear as a single source with a peak at 2.05 m. The robotic vision application may therefore determine how fast the laser needs to be pulsed. The laser array 310, however, can generate pulses at 500 MHz, allow sufficiently high resolution for most applications, at low cost. The MUSIC technique and other multipath resolution algorithms in general are well-known techniques and one of skill in the art would not need further description of them.

By combining a low-cost laser array, with a low cost optical element such as a DOE, and using a multipath algorithm for processing the information received by a small pixel array, a high-resolution, low-power system for 3D robotic vision can be achieved.

Figure 7:
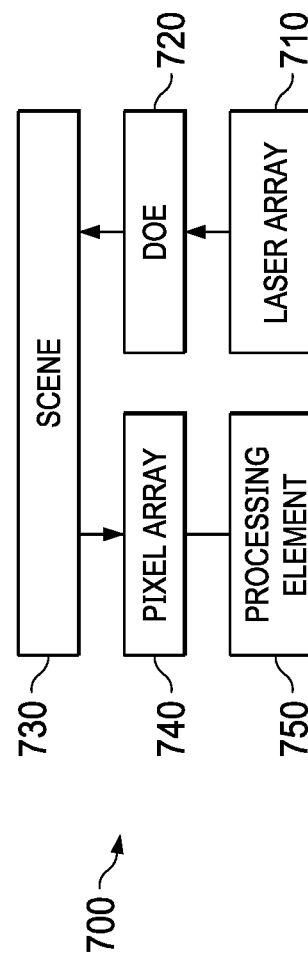
FIG. 7 is a block diagram illustrating a system for 3D robotic vision according to one embodiment.

FIG. 7 is a block diagram of a system 700 for robotic vision that incorporates the elements described above, according to one embodiment. In this system, the laser array 710 generates laser light pulses that pass through DOE 720, generating a virtual array of points illuminating scene 730, reflecting light back to the pixel array 740. The pixel array 740 generates signals that are processed by processing element 750 programmed to use a multipath resolution algorithm, which can be a microprocessor, an application specific integrated circuit (ASIC), a field-programmable gate array (FPGA), or any other desired type of processing element. Using this system, high-resolution 3D robotic vision can be achieved at a low cost and with low power requirements.

Modifications are possible in the described embodiments, and other embodiments are possible, within the scope of the claims.

We claim:
1. A system for three-dimensional robotic vision, comprising:
   a light source;
   an optical element, configured to project a virtual array pattern of laser points configured to illuminate a scene;
   an imaging lens, configured to receive reflected light from the scene and project this light onto an M×N pixel array, where M and N are each less than the respective corresponding dimension of the virtual array pattern; and
   a processing element, coupled to the pixel array, and configured to generate a three-dimensional map of the scene from information generated by the pixel array responsive to receiving the reflected light.

2. The system of claim 1, wherein the light source includes lasers, each respective laser configured to generate light pulses at different times.

3. The system of claim 1, wherein the light source generates light pulse sequences, each of the respective light pulse sequences generated at different times.

4. The system of claim 1, wherein the light source generates nanosecond wide pulses.

5. The system of claim 1, wherein the optical element includes: a diffractive optical element configured to receive light from the light source and diffract the light into the virtual array pattern.

6. The system of claim 1, wherein the optical element includes: an optical microelectromechanical system (MEMS).

7. The system of claim 1, wherein the optical element includes a phased array.

8. The system of claim 1, wherein the processing element is programmed with a multipath resolution algorithm and configured to process the signal information received from the pixel array.

9. A system for three-dimensional robotic vision, comprising:
   a light source;
   an optical element, configured to project a virtual array pattern of laser points that illuminates a scene;

an imaging lens configured to receive reflected light from the scene and project the light onto an M×N pixel array, where M and N are each less than the respective corresponding dimension of the virtual array pattern.

10. The system of claim 9, wherein the light source includes lasers, each respective laser configured to generate light pulses at different times.

11. The system of claim 9, wherein the light source generates light pulse sequences, each of the respective of light pulse sequences generated at different times.

12. The system of claim 9, wherein the light source generates nanosecond wide pulses.

13. The system of claim 9, wherein the optical element includes: a diffractive optical element configured to receive light from the light source and diffract the light into the virtual array pattern.

14. The system of claim 9, wherein the optical element includes: an optical microelectromechanical system (MEMS).

15. The system of claim 9, wherein the optical element includes a phased array.

16. The system of claim 9, further comprising a processing element programmed with a multipath resolution algorithm, and configured to process reflected light information received from the pixel array.

* * * * *